United States Patent [19]

Dietz et al.

[11] 4,013,929

[45] Mar. 22, 1977

[54] MULTIPLE DUTY COMPONENTS OF A GROUND FAULT RECEPTACLE

[75] Inventors: Robert E. Dietz, Cedar Rapids; Darrell P. Ophaug, Marion, both of Iowa; Lynn B. Steve, Port Richey, Fla.

[73] Assignee: Square D Company, Park Ridge, Ill.

[22] Filed: Apr. 18, 1975

[21] Appl. No.: 569,260

[52] U.S. Cl. .............................. 361/357; 335/18; 361/42

[51] Int. Cl.² ......................................... H02B 1/04

[58] Field of Search ............... 317/18 D, 27 R, 112, 317/120; 335/18, 202; 200/159 A

[56] References Cited

UNITED STATES PATENTS

| | | | |
|---|---|---|---|
| 3,813,579 | 5/1974 | Doyle | 317/18 D |
| 3,931,601 | 1/1976 | Anderson | 317/18 D |
| 3,936,699 | 2/1976 | Adams | 317/18 D |

*Primary Examiner*—Gerald P. Tolin
*Attorney, Agent, or Firm*—Harold J. Rathbun; Ernest Kettelson

[57] ABSTRACT

An electric receptacle for ordinary household or trade size junction boxes having a complete ground fault circuit interrupter incorporated in the receptacle, including electronic components to detect a ground fault on the load side of such receptacle, and a coil and trip mechanism which is actuated when a ground fault is detected. A number of the components are utilized in this invention in ways that enable them to perform multiple functions eliminating the need for separate components and the space they would require, thereby making it possible to install a complete ground fault circuit interrupter in a smaller space within a receptacle.

2 Claims, 19 Drawing Figures

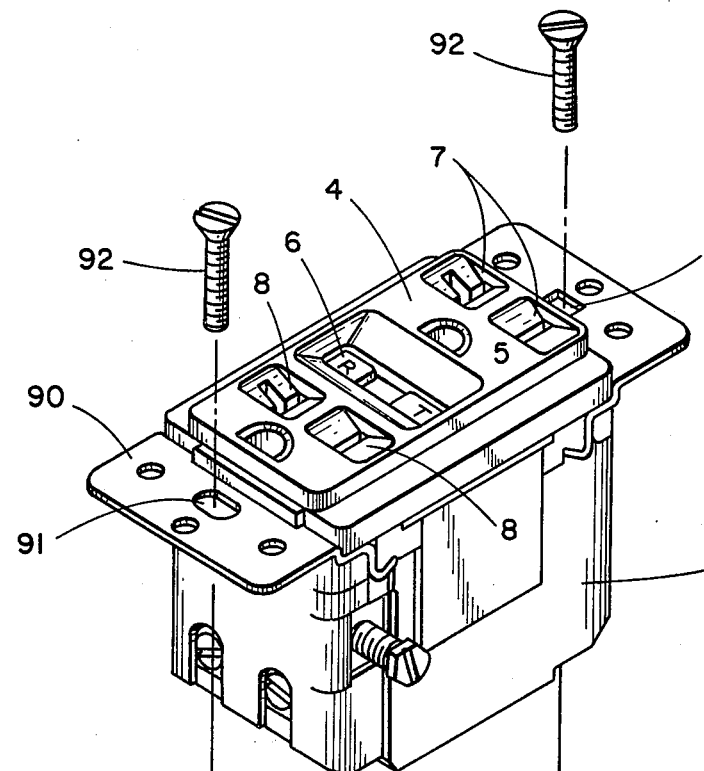
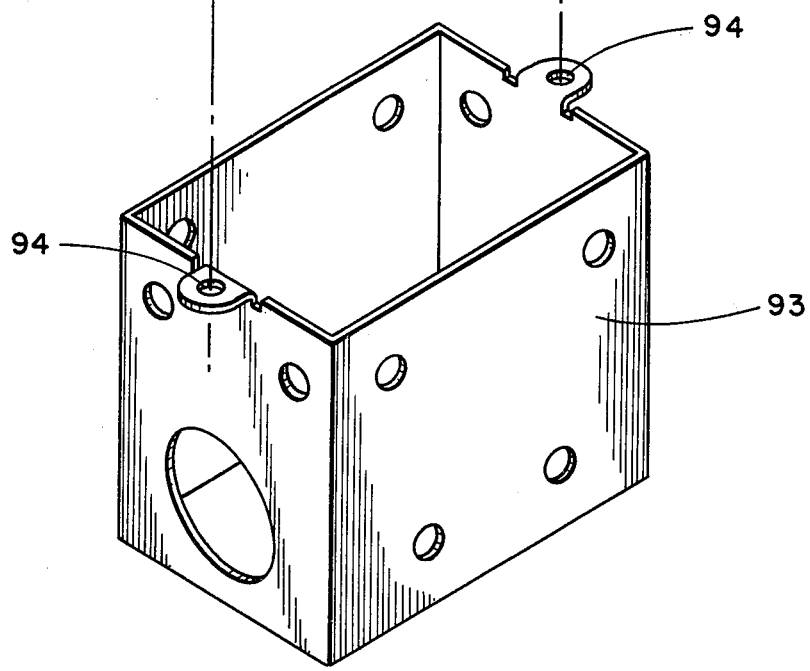
FIG.2

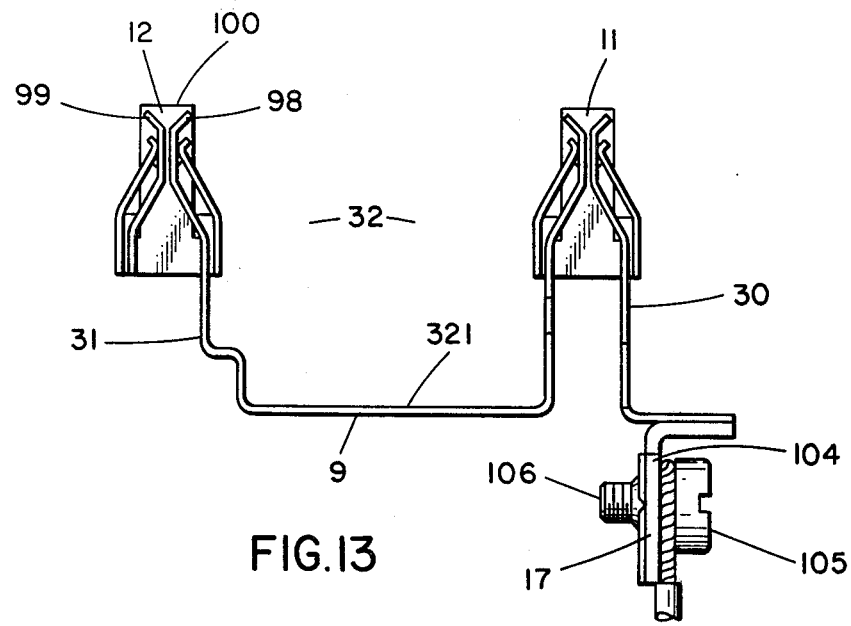
FIG.13
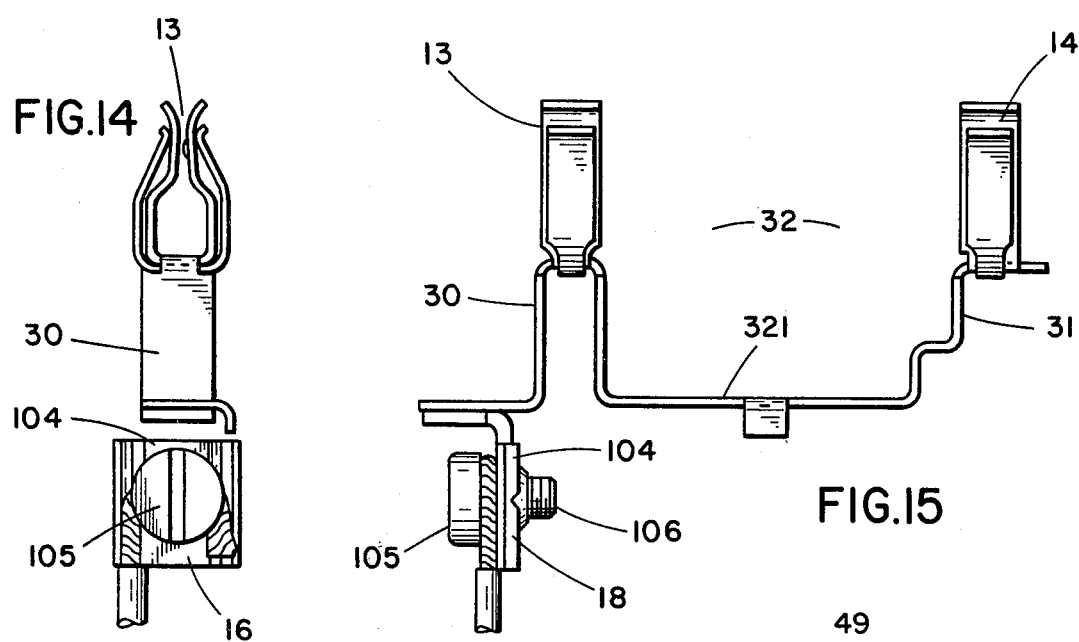
FIG.14
FIG.15
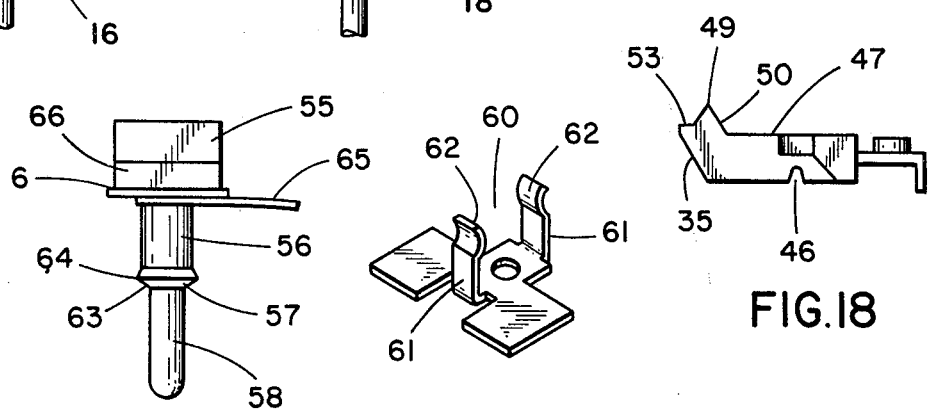
FIG.16
FIG.17
FIG.18

MULTIPLE DUTY COMPONENTS OF A GROUND FAULT RECEPTACLE

BACKGROUND OF THE INVENTION

This invention relates to the field of devices for protecting electric circuits from the hazards of ground fault currents, as distinguished from other types of faults such as short circuits and other overcurrent abnormalities. A ground fault is one which occurs, in a circuit having a neutral conductor grounded at its source, when contact is made with an electrified conductor in the circuit through a person or a conductive article in contact with the ground. This results in a ground fault current flowing back to the grounded source partially or wholly through a ground path.

Ground fault interrupting mechanisms have heretofore been incorporated in devices such as circuit breakers installed in a permanent branch circuit for indefinite continuous protection, and in portable units for temporary field use to protect portable tools and the like which can be readily connected and disconnected to the available power source at the location of use. These are typically large devices because of the number and size of components involved.

Ground fault sensing devices generally utilize a differential transformer consisting of a frame or ring type core surrounding a central opening or "window". The line or electrified conductor and the neutral conductor of the protected circuit may be wound on the core, or merely pass through the window whereby they constitute a single turn primary winding. Current to and from the load through these conductors produces mutually cancelling magnetic flux resulting in zero magnetic flux in the transformer core. However, when a portion of the current flows to ground because of a ground fault and returns to source through a ground path rather than through the neutral conductor, the magnetic flux resulting from current flow through the conductors becomes unbalanced and does not cancel out. A voltage or fault signal is thereby induced in a secondary winding provided on the core of the transformer, this winding being electrically associated with circuit interrupting means for opening the protected circuit. Ground fault interrupters can be made responsive to fault currents as low as 4 or 5 milliamperes, thereby adding substantially to protection of human life as well as protection from protection from other hazards resulting from ground faults.

It is desirable to make such protection readily and conveniently available for general household use, particularly in areas most susceptible to ground faults such as bathrooms, kitchens, swimming pools, garages, and in other areas such as construction sites. It is therefore advantageous to provide a receptacle which incorporates ground fault protection therein and which is still small enough to fit in ordinary household or common trade size junction boxes. Ground fault protection can thereby be made available easily and inexpensively for existing circuit installations merely by replacing an existing receptacle with one incorporating ground fault protection in accordance with this invention. One modification includes feed-through protection, so all outlets in the circuit on the downstream side of the feed-through ground fault receptacle, i.e. opposite the source side, are provided with protection against ground fault hazards. Miniaturization of the ground fault interrupting circuitry and mechanism is required in order to incorporate a complete system within a receptacle small enough to fit ordinary household or common trade size junction boxes. More efficient use of space is also required, and achieved by such measures as employing a circuit scheme that eliminates the need for one or more components which are necessary in other presently known ground fault protection devices, and by making certain components perform more than one function.

The invention herein accomplishes the objectives of miniaturization and more efficient use of space, enabling incorporation of a complete ground fault interrupter within a small receptacle that can be mounted in an ordinary size household type junction box. Such receptacle in accordance with this invention includes additional features such as (a) structural embodiments which qualify for 20 ampere rating in 120 VAC circuits, (b) an anti-teasing member to prevent the reset button from "teasing" open or separating the contacts to a less than fully open position, (c) inclusion of a ground terminal having a ground attachment screw, (d) clamp plate type terminations, (e) heavy duty NEMA type plug terminals, (f) feed-through protection of downstream outlets, and (g) an audible signal means to provide a warning if the receptacle is back wired.

SUMMARY OF THE INVENTION

It is an object of the invention to provide a small receptacle for ordinary size household type junction boxes, with a complete ground fault circuit interrupter in the receptacle, including means to test the operation thereof.

It is an object of the invention to provide miniaturized components and circuitry to detect a ground fault in the protected circuit, as well as a miniaturized coil and trip mechanism to interrupt the protected circuit on occurrence of a ground fault therein.

It is an object of the invention to provide audible signal means to indicate a feed-through ground fault receptacle is back wired, and to utilize the coil and armature of the tripping mechanism to perform such additional function.

It is an object of the invention to provide a circuit scheme for operation of a ground fault interrupter which utilizes the main breaker that opens the protected circuit to perform the additional function of opening and closing the ground fault interruption circuit which energizes the trip coil, thereby eliminating a switch or other component to perform such additional function.

BRIEF DESCRIPTION OF THE DRAWING

FIG. 2 is an exploded view of the ground fault receptacle of FIG. 1 and a junction box.

FIG. 10 is a bottom plan view of the face plate in accordance with this invention and accompanying mounting screws.

FIG. 13 is a side elevation view of the neutral bus bar shown removed from the receptacle.

FIG. 14 is an end elevation view of the electrified or hot bus bar shown removed from the receptacle.

FIG. 15 is a side elevation view of the electrified or hot bus bar shown removed from the receptacle.

FIG. 16 is an elevation view of the test button of this invention.

FIG. 17 is a perspective view of the over-center cupped member of this invention.

FIG. 18 is a side elevation view of the movable contact carrier of this invention.

DESCRIPTION OF PREFERRED EMBODIMENT

Figure 1:
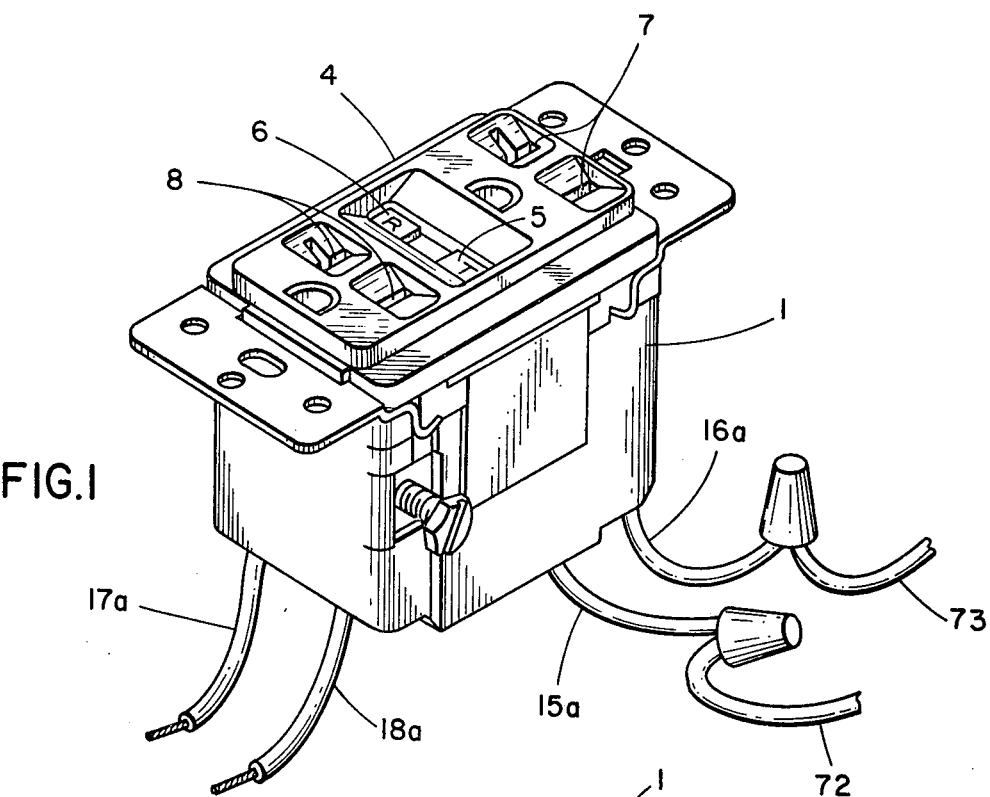
FIG. 1 is a perspective view of a ground fault receptacle with face plate attached in accordance with this invention.
Figure 4:
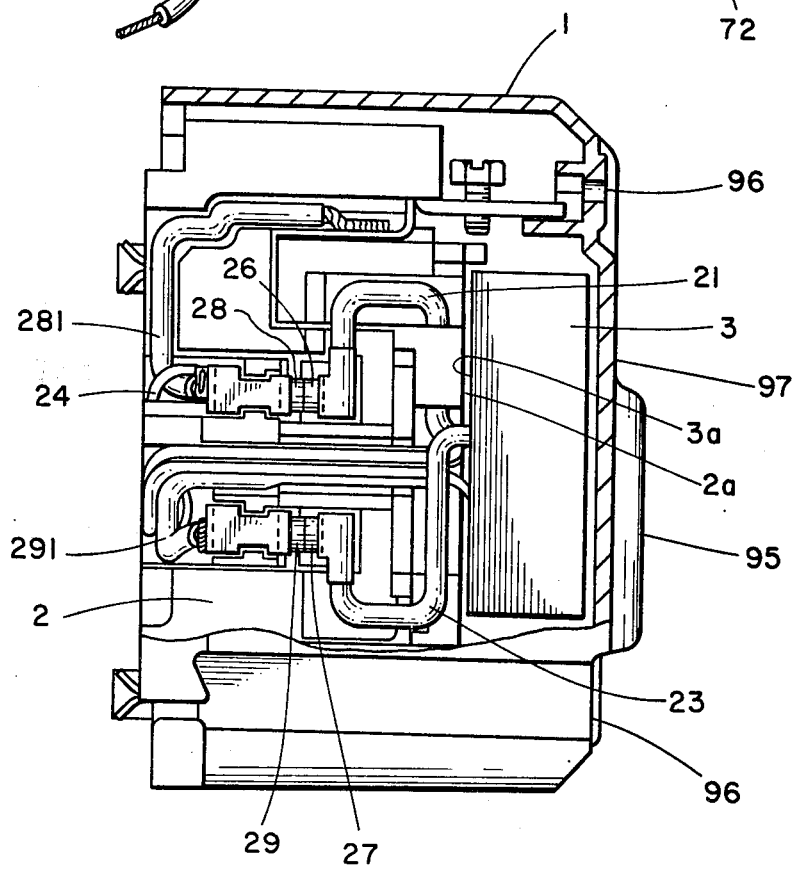
FIG. 4 is a side elevation view of the receptacle body through a broken away side wall of the outer case.

The receptacle in accordance with this invention has an outer case 1 to hold the receptacle body 2 and electronic module 3 therein. A face plate 4 covers the open front of case 1 and provides openings for test button 5, reset button 6 and plug-in openings 7 and 8.

Receptacle body 2 includes two bus bars, one designated as neutral bus bar 9 and the other as electrified or "hot" bus bar 10. Jaw members 11 and 12 project from spaced apart raised regions of neutral bus bar 9 and open to plug-in openings 7 and 8 respectively. Jaw members 13 and 14 project from spaced apart raised regions of electrified bus bar 10 and also open to plug-in openings 7 and 8 respectively.

Line side terminals 15 and 16 are electrically connected through respective conductors hereafter described to bus bars 9 and 10 respectively, terminal 15 being designated neutral and terminal 16 being designated as hot or electrified. Load side terminals 17 and 18 are electrically connected to the bus bars 9 and 10 respectively at the load side terminations thereof, terminal 17 being designated neutral and terminal 18 being designated as "hot" or electrified. The load side terminals are provided for receptacles that furnish feed-through ground fault protection to outlets on the downstream side of the ground fault receptacle. The line side terminals 15 and 16 include plate members 15a and 16a respectively, which project rearwardly from receptacle body 2 at one end region thereof for a short distance substantially normal to the plane of back wall 2a. Load side terminals 17 and 18 include plate members 17a and 18a, respectively, which project rearwardly from receptacle body 2 for a short distance at the opposite end region thereof, substantially normal to the plane of back wall 2a.

Electronic module 3 encases the ground fault detecting means and associated components to energize trip coil 19 on occurrence of a ground fault. Module 3 is a relatively thin rectangular case having a flat front wall 3a formed to lie flush against back wall 2a of receptacle body 2. The depth of module 3 is less than or no greater than the short projecting length of terminal plate members 15a–18a from back wall 2a. The length of module 3 is less than or not greater than the distance between line side terminal plate members 15a–16a and load side terminal plate members 17a–18a. The width of module 3 is less than or no greater than the width of receptacle body 2. Accordingly, electronic module 3 is shaped and dimensioned to lie flat against back wall 2a of receptacle body 2 substantially within the space defined by the spaced apart terminal plate members 15a–18a projecting from said back wall 2a.

Figure 9:
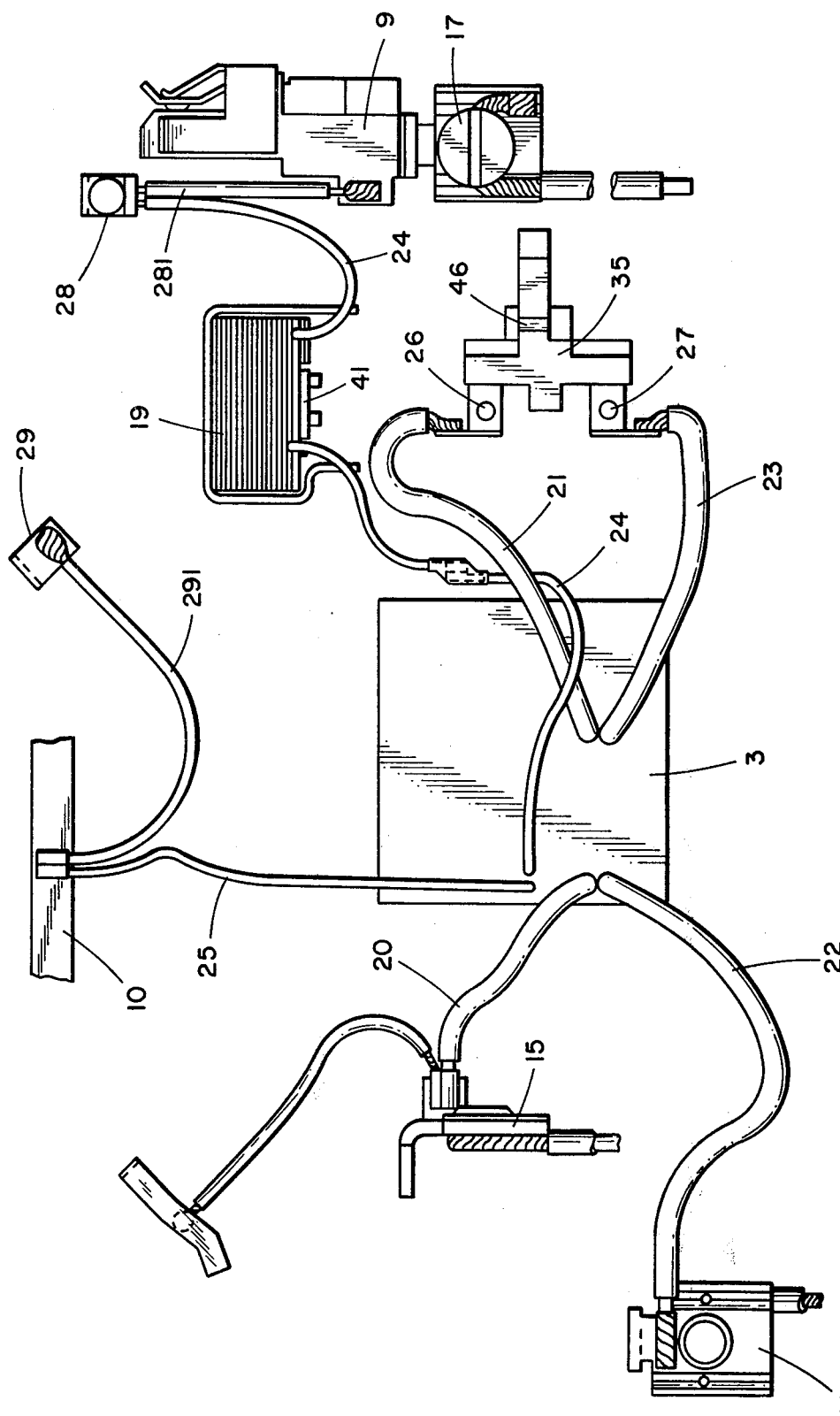
FIG. 9 is a plan view of the electronic module showing the leads extending therefrom and their respective connections to parts of the receptacle shown removed therefrom.

Module 3 has six leads 20–25 extending therefrom, as best shown in FIG. 9. Lead 20 connects to line side neutral terminal 15, lead 21 connects to neutral movable breaker contact 26, lead 22 connects to line side electrified terminal 16, lead 23 connects to electrified movable breaker contact 27, lead 24 connects in series to trip coil 19 and to a neutral conductor, that is, bus bar 9, on the load side of stationary breaker contact 28, and lead 25 connects to bus bar 10, the electrified or hot conductor, on the load side of stationary breaker contact 29. Stationary breaker contact 28 is connected to neutral bus bar 9 by conductor 281. Stationary breaker contact 29 is connected to hot bus bar 10 by conductor 291.

Figure 3:
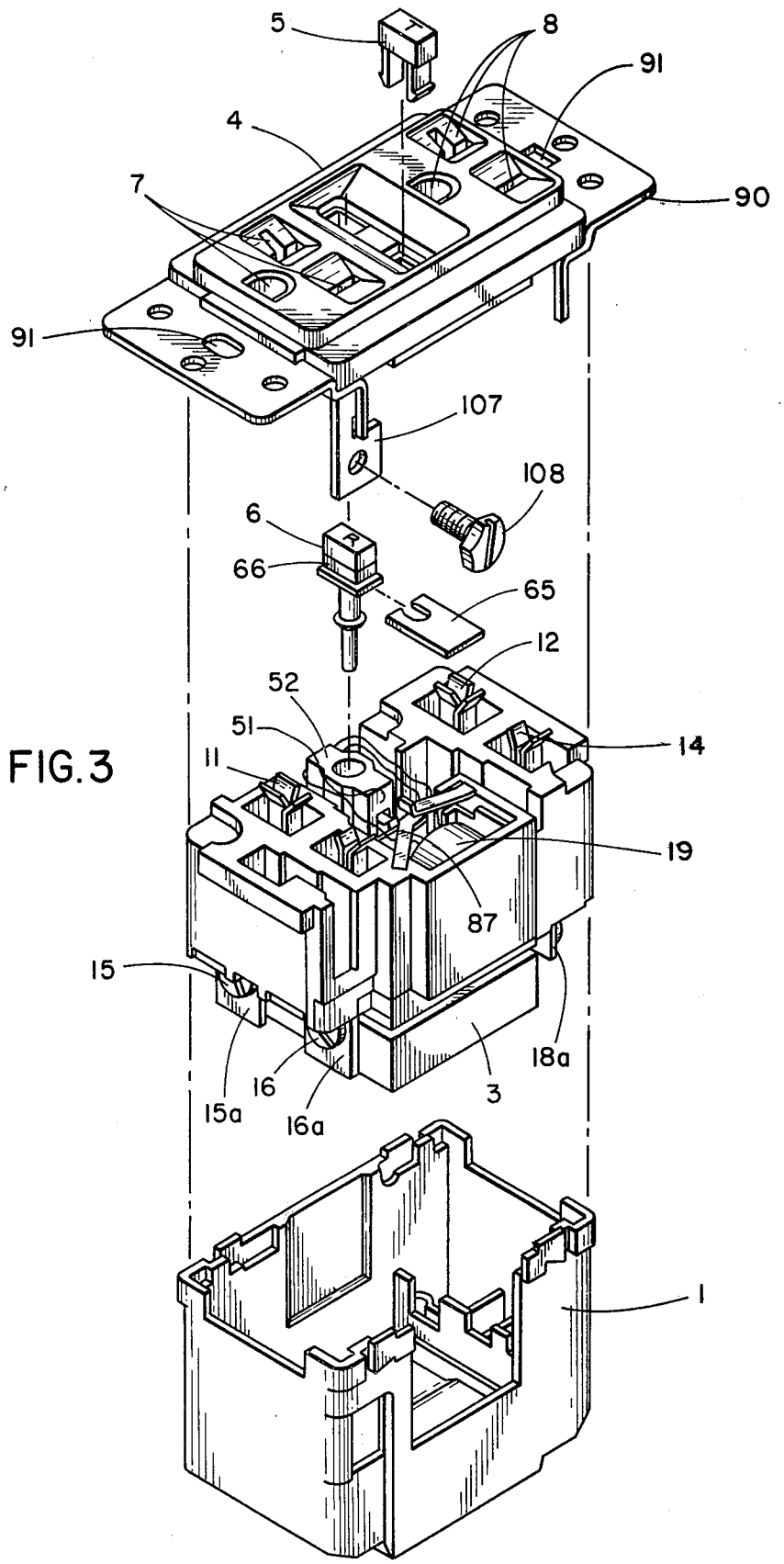
FIG. 3 is an exploded view of the ground fault receptacle of FIG. 1.
Figure 7:
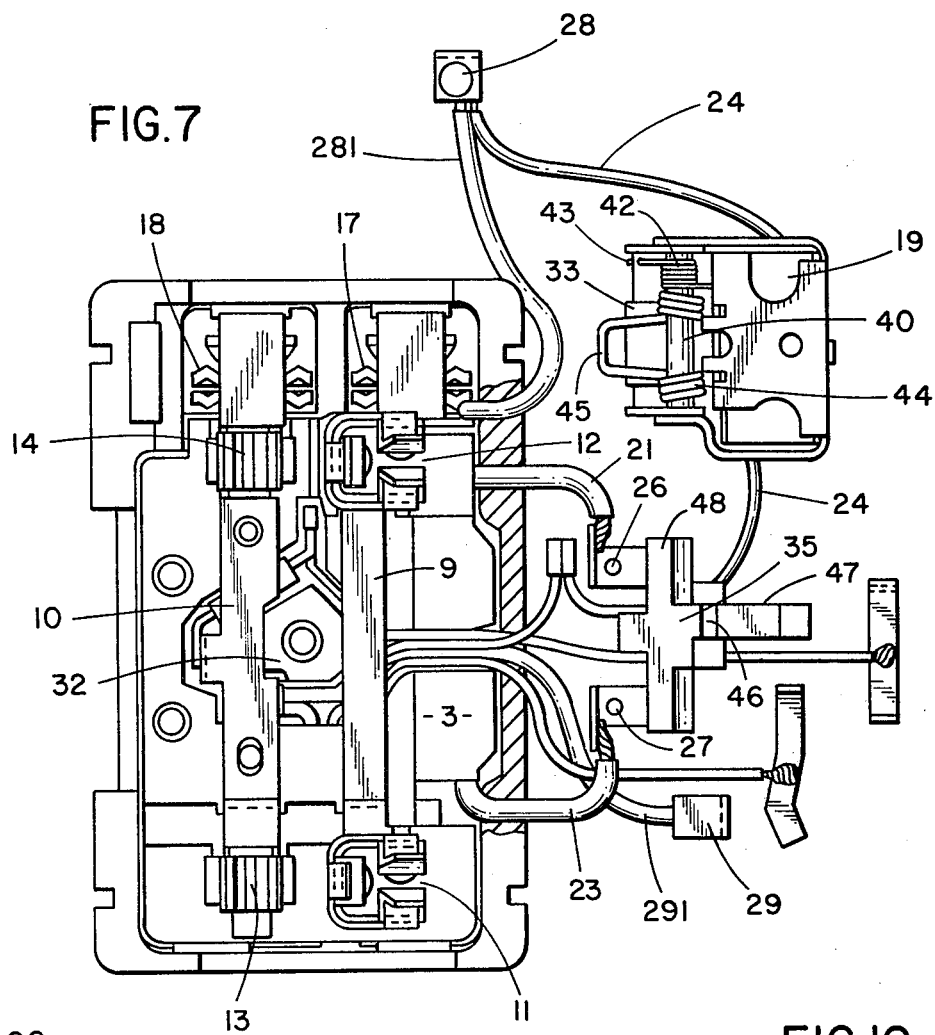
FIG. 7 is a plan view of the receptacle body in FIGS. 1 and 6 with the contact assembly additionally lifted out of the receptacle body.

The bus bars 9 and 10 lie in spaced apart parallel planes longitudinally through receptacle body 2, from one end thereof to the opposite end (See FIG. 7). Each consists of a metal strip having a somewhat contoured profile in elevation (see FIGS. 3 and 13). The bus bar metal strips are shaped in a particular profile contour as described and shown herein to achieve maximum economy of space within the volume of receptacle body 2. The contour provides a first raised region 30 at the line side end of bus bars 9 and 10 for electrical communication with jaw members 11 (neutral) and 13 (electrified or hot), respectively, which extend upward to open at plug-in opening 7. The contour provides a second raised region 31 at the load side end region of bus bars 9 and 10 for electrical communication with jaw members 12 (neutral) and 14 (electrified or hot) respectively, which extend upward to open at plug-in opening 8. The contour profile further provides an intermediate dropped region 321 of each bus bar 9 and 10 which extends between raised regions 30 and 31 and lies generally adjacent the back wall 2a of receptacle body 2 for the entire length between raised regions 30 and 31. Such contoured profile of bus bars 9 and 10 provides an unobstructed three-dimensional interior space 32 within receptacle body 2 by shaping the connecting portions of the bus bars so they are out of the way, which would otherwise cut across such interior space and prevent its use for other elements or components. The interior space 32 provided thereby is large enough to accomodate trip coil 19, armature 33, latch 34, movable contact carrier 35 and associated stationary contacts 28 and 29 on their respective mountings, in addition to a test switch 36 and reset button 37. The intermediate regions 321 of the bus bars could also be formed to lie immediately adjacent a respective side wall for their entire length between spaced apart raised regions 30 and 31, in such a way that the broad surfaces of the bus bars throughout intermediate regions 321 lie parallel to the plane of such side walls. In this manner, the bus bars would also be out of the way to provide an unobstructed three-dimensional interior space 32.

Trip coil 19 is mounted within this unobstructed interior space 32 with its axis extending in a direction transverse to that of the bus bars 9 and 10, its back wall 38 lying adjacent side 39 of receptacle body 2. Armature 33 is rotatably mounted on pivot shaft 40 to face the core 41 of coil 19, and to rotatably move between an in-contact and out-of-contact position therewith. Latch 34 is mounted to move with armature 33 and is positioned to latch contact carrier 35 in the closed contact position when armature 33 is out of contact with and spaced from core 41 of trip coil 19. Armature latch spring 42 is secured and coiled on shaft 40, with movable end 43 in contact with armature 33 to bias the armature normally away from coil 19.

Main spring 44 is also secured and coiled on shaft 40, with movable cradle portion 45 formed intermediate thereof in bearing engagement against the underside of contact carrier 35 in groove 46 thereof. Main spring 44 is biased oppositely of armature latch spring 42, thus urging contact carrier 35 to a normally contact open position.

The movable contact carrier 35 includes an elongated body portion 47 (FIG. 7) with groove 46 formed across the underside thereof at mid-region, and a cross-arm portion 48 formed at the forward end of the body portion to give the carrier a T-shape plan configuration. A raised ridge 49 (FIG. 18) is formed across the upper side of the body portion 47 rearwardly of the mid-region, having an abutment surface 50 inclined at approximately a 45° angle viewed from side elevation.

Abutment surface 50 contacts a corresponding abutment surface 51 formed on a mounting projection 52 of receptacle body 2, to limit movement of carrier 35 in the contact opening direction. The carrier 35 also includes a rearwardly projecting ledge 53 positioned to face upwardly and bear against latch 34 when carrier 35 is urged against the bias of main spring 44 to the contact closed position. Latch 34 thus holds contact carrier 35 in the contact closed position until latch 34 is carried out of bearing engagement against projecting ledge 53 by movement of armature 33 toward trip coil 19 when energized upon occurrence of a ground fault.

Figure 11:
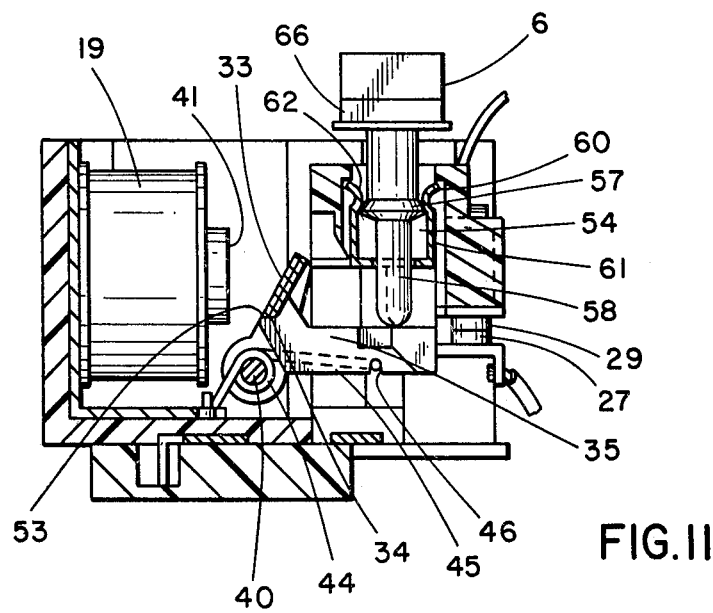
FIG. 11 is a section view on line 11—11 of FIG. 5 in contact closed position.

Movable breaker contacts 26 and 27 are mounted at respective opposite ends of cross-arm portion 48 of carrier 35, facing upward therefrom, and aligned for contact respectively with stationary breaker contacts 28 and 29. Contacts 26 and 28 are shown and described herein as breaker contacts for the neutral conductor (or load to source current path) while contacts 27 and 29 are shown and described as breaker contacts for the electrified or hot conductor (or the source to load current path). The contacts are held firmly in closed position by the bias of main spring 44 against the underside of carrier 35 across groove 46 at the mid-region thereof when latch 34 is in latched and bearing engagement against the upper face of rearwardly projecting ledge 53 of carrier 35 (FIG. 11).

Figure 12:
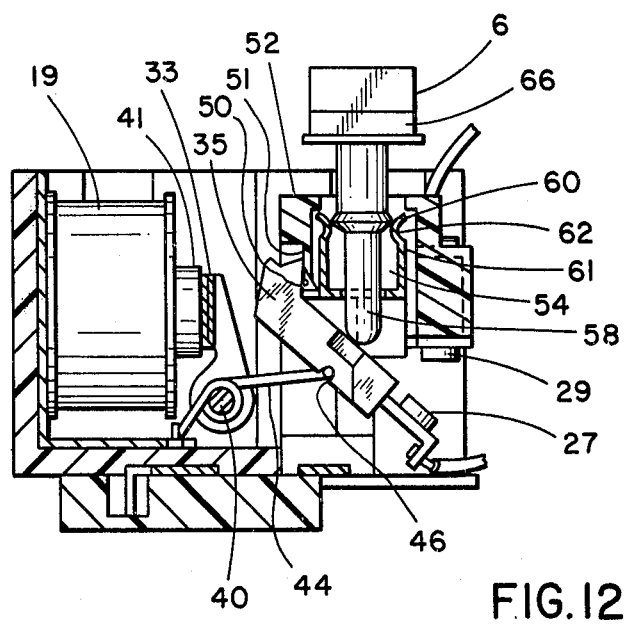
FIG. 12 is a section view on line 11—11 of FIG. 5 showing the mechanism in tripped condition.

When latch 34 is moved out of bearing engagement on occurrence of a ground fault as described above, the bias of main spring 44 against the underside of carrier 35 provides a rocking action of the carrier on the cross-arm of cradle portion 45 of main spring 44, the rearward portion of the carrier rocking upwardly and the forward portion rocking downwardly carrying the movable contacts 26 and 27 rapidly out of contact with stationary contacts 28 and 29 (FIG. 12).

Figure 5:
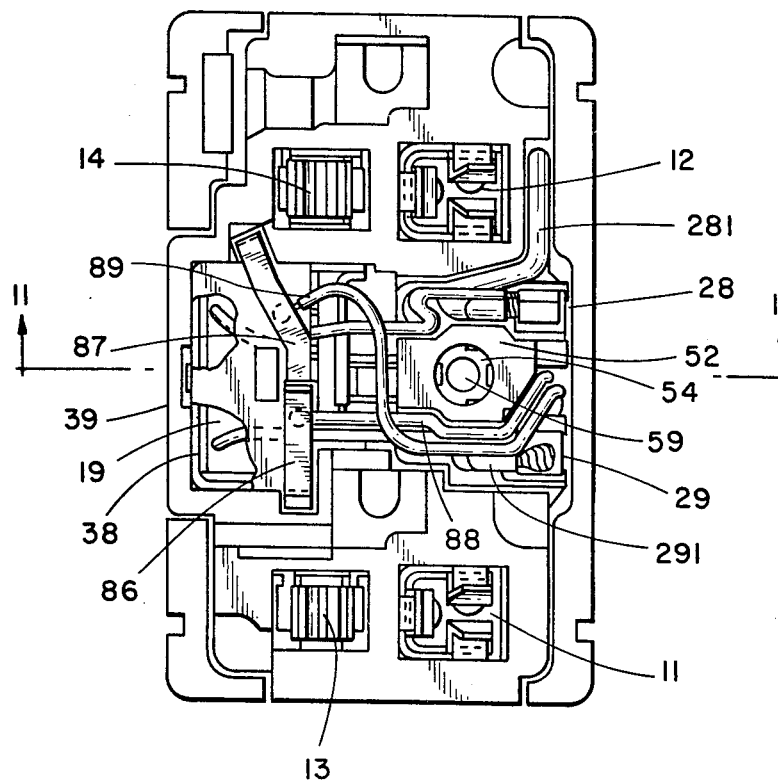
FIG. 5 is a top plan view of the ground fault receptacle with the face plate removed.
Figure 6:
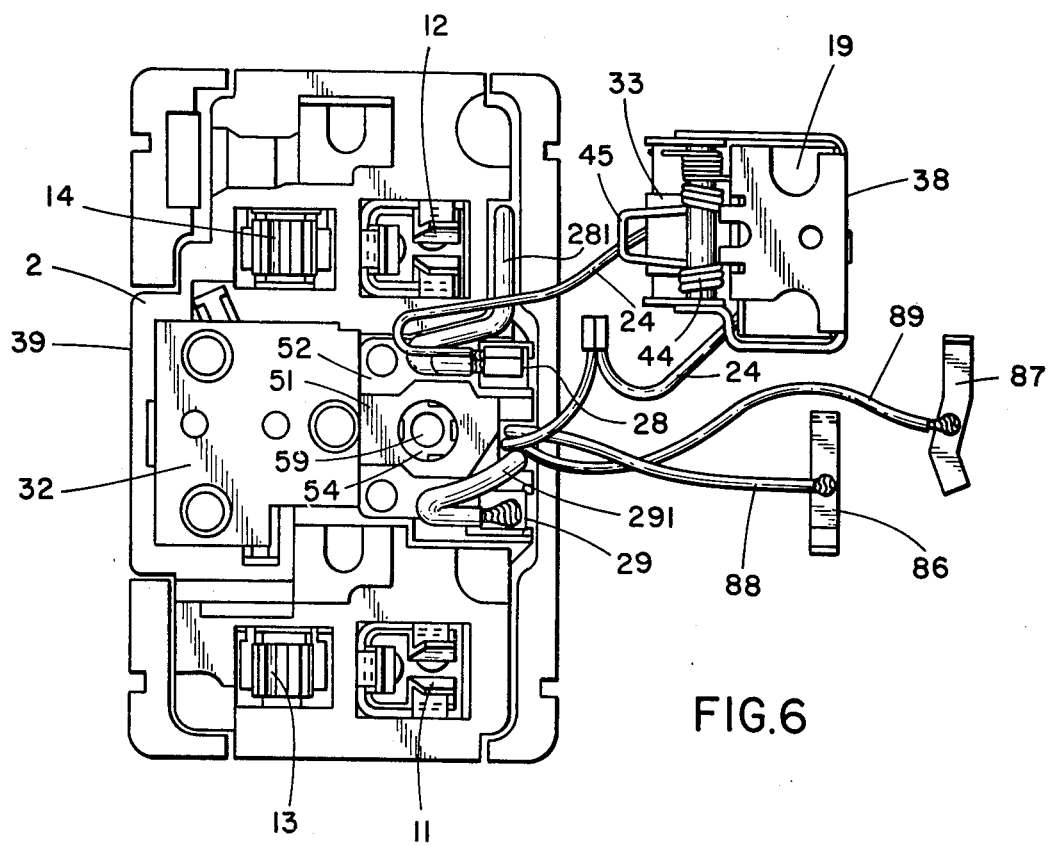
FIG. 6 is a plan view of the receptacle body in FIG. 5 with the trip coil and armature assembly, and test contacts, lifted out of the receptacle body.

A reset button 6 is seated within a recess 54 extending into mounting projection 52 of receptacle body 2. Referring to FIG. 16, the reset button 6 includes a head 55 which projects outwardly from said recess 54, an integrally joined cylindrical body 56, an annular ring segment 57 appearing frusto-conical in elevation integrally formed between said cylindrical body 56 on one side thereof and a shaft 58 on the other. Cylindrical body 56 is of greater diameter than shaft 58. A bore 59 (FIGS. 5 and 6) extends through receptacle body 2 from recess 54 to an opening above the body portion of carrier 35 at mid-region thereof, at a location offset from underside groove 46. Shaft 58 extends through bore 59 when reset button 6 is seated in recess 54, and it is positioned to bear against contact carrier 35 when reset button 6 is depressed. Contact carrier 35 again rocks on the cross arm of cradle 45 of main spring 44 as a result of pressure in one direction against the upper side from shaft 58 and bias in the opposite direction from the cradle of main spring 44 bearing against the underside in groove 46, the opposed pressure points being offset. The rearward portion of carrier 35 rocks downwardly until rearward projecting ledge 53 is engaged and latched by latch 34, the forward portion of carrier 35 being rocked and forced upwardly until contacts 26–27 and 28–29 are closed, at which time rearward projecting ledge 53 is latched.

An over-center compression member 60 is mounted in recess 54 to engage annular ring segment 57 as reset button 6 is depressed. Compression member 60 is a cupped structure which fits within recess 54, having a central hole in registration with bore 59 to receive shaft 58 of reset button 6. The side walls 61 of cupped compression member 60 are resiliently tensioned to spread apart slightly from pressure applied radially outward, and to spring back when such pressure is released. An arcuate projection or rounded bead 62 is formed on the inner surface of side walls 61, extending radially inward from opposite points of side walls 61 immediately within the entrance to cupped compression member 60 adjacent the rim thereof to define a tapering narrowed opening into said member.

As reset button 6 is urged inwardly to bear against contact carrier 35 and move it to a latched contact closed position, broad annular tapered surface 63 of ring segment 57 (FIG. 16) (sloping from smaller diameter shaft 58 to annular apex 64 of frusto-conical ring segment 57) engages projecting head 62 and spreads side walls 61 apart under tension until the annular apex 64 of ring segment 57 slides past the most inwardly projecting points of rounded bead 62. When contact carrier 35 is pushed limit-inward against the bias of main spring 44, it begins to rock toward a contact closed position, the rearward ledge 53 latching and the forward end rocking from open to closed contact position which urges reset button 6 outwardly. At this point, annular apex 64 of ring segment 57 begins to bear against projecting bead 62 which tends to restrain reset button 6 from further outward movement until the bias of main spring 44 overcomes the restraint of bead 62 and forces side walls 61 apart enough for ring segment 57 to slip past. At such point, apex 64 slips over center past bead 62 and reset button 6 is rapidly forced outwardly. At this same time, the forward end of contact carrier 35 snaps from a fully contact open to a fully contact closed position. The co-action between the apex 64 of the ring segment of the reset button and the bead 62 of the over center compression member prevents holding the reset button 6 stationary during that portion of its stroke when apex 64 engages projecting bead 62. Thus, the reset button 6 cannot be manipulated to hold the contacts in a slightly open position, or with one contact closed (e.g. the hot or electrified contact) and the other (neutral) contact open. If pressed firmly enough to move at all against the bias of tensioned projecting bead 62 on the broad annular tapered surface 63, the reset button 6 will slip over center to the full contact open position of its stroke and conversely from fully open to fully closed position when pressed to reset the breaker after a ground fault or test.

A resilient metal strip 65 is mounted on reset button 6 immediately below rectangular head 55, and positioned to bear against the inner surface of face plate 4 to urge reset button 6 and head 55 inwardly. A red or other brightly colored band 66 is provided around the periphery of head 55 adjacent its junction with cylindrical body 56. The color of band 66 is different than the color of adjacent portions of reset button 6 to provide readily noticeable contrast of colors. The width of colored band 66 is equal to, or less than, the distance reset button 6 moves between (a) the contact closed position when band 66 is fully concealed inwardly of face plate 4 and (b) the contact open position when it is fully exposed outwardly of face plate 4. In the contact closed position, reset button 6 will seat deeper in recess 54 and colored band 66 will not show outwardly of face plate 4. In the contact open position, carrier 35 bearing against reset button shaft 58 is urged outwardly by main spring 44 which in turn moves the reset button outwardly until colored band 61 on head 55 is visible outwardly of face plate 4. Thus colored band 16 provides a visible signal to notify and warn that contacts 26-27 and 28-29 are open when the band appears outwardly of face plate 4 and closed when the band does not appear outwardly of face plate 4.

The ground fault detecting means encased within module 3 and associated components will now be described briefly. Various modifications may be made in such circuit and components, but the embodiment described herein is preferred. It performs the required functions with fewer parts, thus enabling a more compact unit, and does so more reliably and economically. The following described embodiment of a ground fault detecting circuit is quiescent until a ground fault or other actuating condition occurs, as distinguished from others which must operate continuously at least in part.

Figure 19:
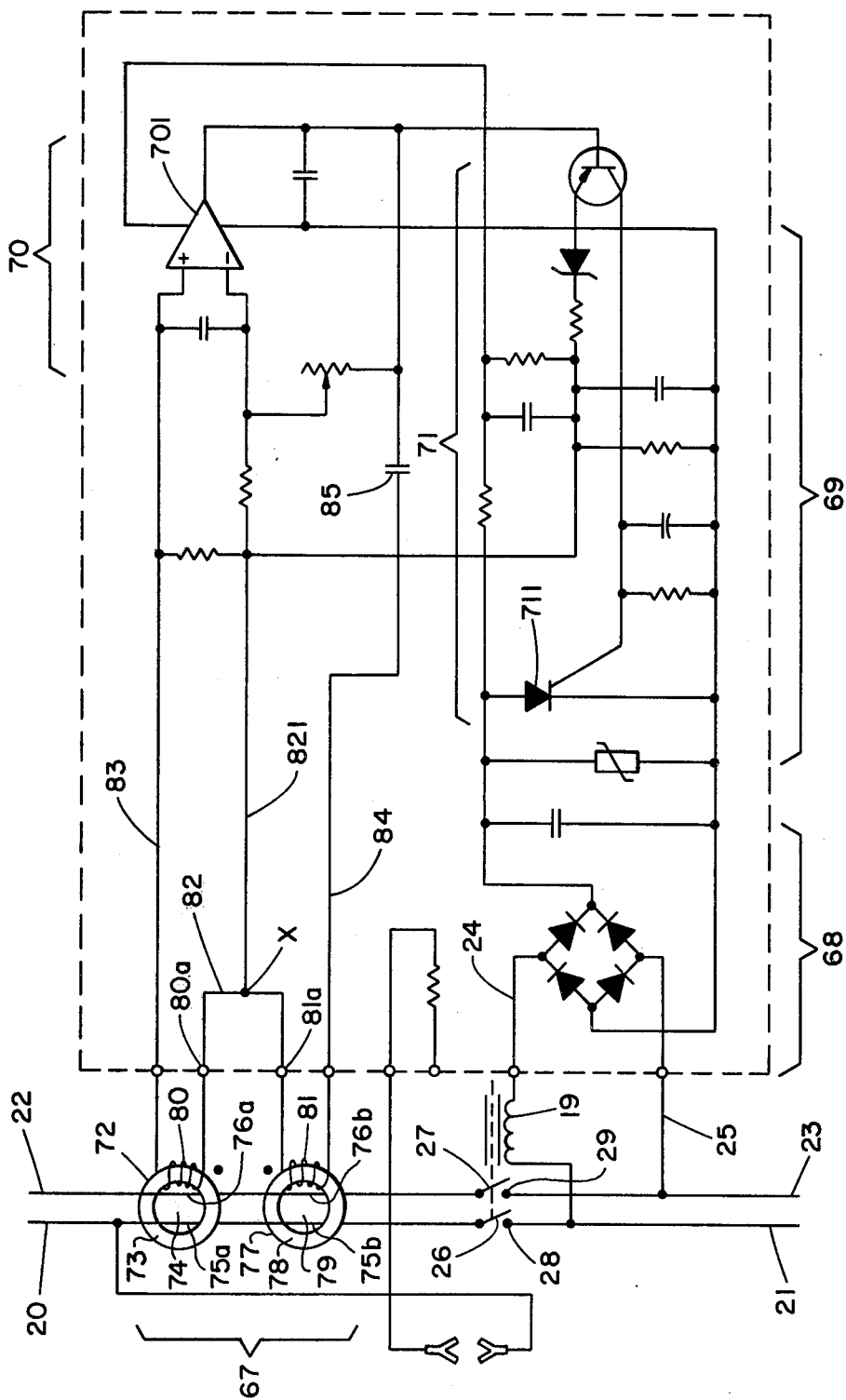
FIG. 19 is a schematic drawing of the electronic circuit in the module of a preferred embodiment of this invention.

Referring to FIG. 19, the module circuit and components include essentially (a) ground fault sensing means 67, (b) rectified power supply means 68, (c) voltage regulation means 69, (d) amplification means 70, and (e) switching means 71. Such a module circuit is disclosed in copending patent application Ser. No. 480,104 filed June 17, 1974.

The ground fault sensing means 67 includes a differential transformer 72 comprising a toroidal core 73, a primary winding 74 thereon comprising conductors 75a and 76a making a single turn winding through the window of core 73, a second differential transformer 77 also comprising a toroidal core 78, and a primary winding 79 thereon comprising conductors 75b and 76b making a single turn winding through the window of core 78, the primary windings 74 and 79 being connected in series (conductor 75a to conductor 75b and conductor 76a to conductor 76b). Each transformer 72 and 77 includes a secondary winding 80 and 81 respectively. The end 80a of secondary winding 80 is connected by conductor 82 to end 81a of secondary winding 81, said ends having the same polarity markings. Conductor 83 connects the other end of secondary winding 80 to the non-inverting input terminal of amplification means 70. Conductor 84 connects the other end of secondary winding 81, through capacitor 85, to the output side of amplification means 70. Conductor 821 leads from conductor 82 at junction X to the inverting terminal of amplification means 70.

Leads 20 and 21 which extend from module 3 are connected internally to respective ends of conductors 75a-75b; leads 22 and 23 are connected internally to respective ends of conductors 76a-76b. A neutral (or load to source return current path) is thereby established from line side terminal 15, lead 20, conductor 75a-75b through cores 73 and 78, lead 21, movable breaker contact 26, stationary breaker contact 28, conductor 281, bus bar 9, and load side terminal 17. An electrified or hot (or source to load current path) is established from line side terminal 16, lead 22, conductor 76a-76b through cores 73 and 78, lead 23, movable breaker contact 27, stationary breaker contact 29, conductor 291, bus bar 10, and load side terminal 18.

The module circuit is powered by being connected across the line circuit on the load side of breaker contacts 26-27 and 28-29, (a) by lead 25 connected in series at one end to the hot (or source to load) current path at bus bar 10 and at the other end to the rectified power supply means 68 within module 3; and (b) by lead 24 connected in series at one end to the neutral (or load to source) current path at bus bar 9, through trip coil 19 and at the other end to the rectified power supply means 68.

The voltage regulation means 69 is connected to rectified power supply means 68 to reduce and smooth voltages supplied to the amplification means 70. When a ground fault or grounded neutral occurs in the line circuit, it is detected by the sensing means 67 causing the amplification means 70 to trigger the switching means 71, which includes silicon controlled rectifier 711, into conduction. Prior to such conduction, the module circuit is quiescent and stabilized below the voltage threshold of the switching means 71 thereby drawing insufficient current from the line circuit to trip coil 19. However, when the switching means 71 is triggered into conduction, the stabilized voltage of the module circuit collapses whereby the entire line voltage is applied across the trip coil 19 through leads 24 and 25 connected between the power supply means 68 and respective line conductors (bus bars 9 and 10). The trip coil 19 thereupon attracts armature 33 causing carrier 35 to trip opening contacts 26-27 and 28-29 thus interrupting the line circuit.

When a ground fault occurs, a signal voltage is picked up in secondary winding 80 of differential transformer 72 which is connected to the non-inverting input of operational amplifier 701. The ground fault signal voltage is amplified and applied to the switching means 71 which in turn switches the entire line voltage across trip coil 19 causing it to trip and open the circuit.

When a grounded neutral occurs on the load side of differential transformers 72 and 77, the amplifier 701 also causes switching means 71 to switch the line voltage across trip coil 19 thereby opening the circuit. The secondary winding 81 of the second differential transformer 77 is connected to the output of amplifier 701 through capacitor 85. The resultant magnetic field induced in transformer 77 is at power line frequency and has no effect until the neutral conductor is grounded on the load side of the transformer. When this happens, the neutral conductor grounded at the source and on the load side of the transformer presents a closed loop, and magnetically couples both transformer cores 73 and 78. The series connected primaries 75a and 75b connected to neutral conductors 20–21 effectively provide one turn of wire through both transformer cores 73 and 78, and the output of amplifier 701 is then magnetically coupled, in phase, to the amplifier input. The amplifier 701 then breaks into high frequency osciallation. The high frequency signal is applied to the switching means 71 which is sufficient to trigger SCR 711 into conduction. The switching means 71 thereupon switches the entire line voltage across trip coil 19 and opens the circuit in this manner when a ground occurs on the neutral conductor on the lead side of transformers 72 and 77.

It will be noted that this circuit scheme utilizes line current to power the tirp coil and also utilizes the line breaker contacts to perform the function of a switch controlling the power from the line to the module. Utilizing line current to power the trip coil (rather than current drawn from voltage which is induced on occurrence of a ground fault) enables the use of miniaturized differential transformer cores. Utilizing the line switch to also in addition control the power supply to the module circuit eliminates the need for a separate additional switch or other component. The line switch is enabled to perform such dual function in accordance with this invention by connecting the rectified power supply means 68 of the module circuit to the line circuit on the load side of line breaker contacts 26–27 and 28–29, that is by lead 24 connected to bus bar 9 and lead 25 connected to bus bar 10, in both cases on the side of the breaker contacts opposite the connection to the line at terminals 15 and 16.

Such connection also converts trip-coil 19 and armature 33 into a buzzer or audible signal device for the feed-through ground fault receptacles in the event it is backwired, i.e. if load side terminals 17 and 18 (rather than line side terminals 15 and 16) are inadvertently connected to the line side conductors 72 and 73. In this event, on occurrence of a ground fault or other tripping condition, the module circuit will become operative and cause trip coil 19 to open the line circuit. However, when back wired in this manner to load side terminals 17 and 18, the module connection to line at bus bars 9 and 10 through leads 24 and 25 is now on the opposite or line side of the breaker contacts 26–27 and 28–29. Therefore, coil 19 connected in series with lead 24 is still in a closed circuit because of the back-wired connection across the line at load side terminals 17 and 18, so it still draws current from the line. The line current being alternating, and the rectified power supply means 68 rectifying on each half-wave in which conductor 21 is positive with respect to conductor 23, the coil 19 is energized during those half-waves when conductor 21 is positive with respect to conductor 23 and de-energized during the negative half-waves. Thus, the armature is attracted to the energized coil and released from the de-energized coil 19 once during each cycle, or 60 times per second in a 60 cycle AC circuit. Such rapid contact between armature and coil creates an audible buzzing sound.

A testing means is incorporated in the ground fault receptacle of this invention to simulate occurrence of a ground fault and determine whether the mechanism is working properly and to trigger the audible signal described above if back wired. The testing means includes test button 5 movably mounted in face plate 4 to bear against test contact 86 which then touches test contact 87. Contact 86 is normally biased away from test contact 87. Conductor 88 connects test contact 86 to electrified or hot bus bar 10 which is connected on the load side of the module circuit and sensing means 67. Conductor 89 with an 18K ½ w resistor in line connects test contact 87 to line side neutral terminal 15, i.e. on the line side of the module circuit and sensing means 67. Current thus flows from the electrified or hot line conductor on one side of the ground fault sensing means, which include differential transformers 72 and 77, to the neutral conductor on the other side thereby creating an imbalance of current flow and magnetic flux in the differential transformers and simulating a ground fault condition. If the mechanism is working properly, the coil should trip causing breakers 26–27 and 28–29 to open. The colored band 66 on reset button 6 should also appear outwardly of face plate 4 to provide visual indication that the mechanism has tripped and is functioning as it should. In the event the feed-through ground fault receptacle is back wired as explained above, a warning buzzer sound will be clearly audible as soon as the test button 5 is pressed causing the coil to trip and the breakers to open. As an additional safety precaution, the breaker contacts 26–27 and 28–29 cannot be reset until the back wired line to load terminal connections have been disconnected. In any event, as a further precaution, outlets connected to the circuit on the downstream or load side of the back wired receptacle do have ground fault protection if for some reason the person who installed the back wired receptacle did not push the test button to determine if the mechanism was working properly and wired properly. A ground fault at any downstream outlet would create a current imbalance at the differential transformers in the upstream ground fault receptacle even if back wired, causing it to trip and open the entire downstream circuit. At such time the coil 19 and armature 33 would begin the attract-release sequence and start to buzz.

The ground fault receptacle assembly in accordance with this invention is compact enough to be mounted in junction boxes of ordinary household or trade size, including all of those boxes listed in Table 370–6(a-1) of the National Electrical Code which have a depth of two inches or more, and by using extension rings for the others. This table is reproduced as follows:

Table 370–6(a-1) Deep Boxes

| Box Dimensions, Inches Trade Size | | Cubic Inch Cap. | Maximum Number of Conductors | | | |
|---|---|---|---|---|---|---|
| | | | No. 14 | No. 12 | No. 10 | No. 8 |
| 3¼ × 1½ | Octagonal | 10.9 | 5 | 4 | 4 | 3 |
| 3½ × 1½ | " | 11.9 | 5 | 5 | 4 | 3 |

Table 370-6(a-1) Deep Boxes -continued

| Box Dimensions, Inches Trade Size | | Cubic Inch Cap. | Maximum Number of Conductors | | | |
|---|---|---|---|---|---|---|
| | | | No. 14 | No. 12 | No. 10 | No. 8 |
| 4 × 1½ | " | 17.1 | 8 | 7 | 6 | 5 |
| 4 × 2⅛ | " | 23.6 | 11 | 10 | 9 | 7 |
| 4 × 1½ | Square | 22.6 | 11 | 10 | 9 | 7 |
| 4 × 2⅛ | " | 31.9 | 15 | 14 | 12 | 10 |
| 4 11/16 × 1½ | Square | 32.2 | 16 | 14 | 12 | 10 |
| 4 11/16 × 2⅛ | " | 46.4 | 23 | 20 | 18 | 15 |
| 3 × 2 × 1½ | Device | 7.9 | 3 | 3 | 3 | 2 |
| 3 × 2 × 2 | " | 10.7 | 5 | 4 | 4 | 3 |
| 3 × 2 × 2¼ | " | 11.3 | 5 | 5 | 4 | 3 |
| 3 × 2 × 2½ | " | 13 | 6 | 5 | 5 | 4 |
| 3 × 2 × 2¾ | " | 14.6 | 7 | 6 | 5 | 4 |
| 3 × 2 × 3½ | " | 18.3 | 9 | 8 | 7 | 6 |
| 4 × 2⅛ × 1½ | " | 11.1 | 5 | 4 | 4 | 3 |
| 4 × 2⅛ × 1⅞ | " | 13.9 | 6 | 6 | 5 | 4 |
| 4 × 2⅛ × 2⅛ | " | 15.6 | 7 | 6 | 6 | 5 |

See Section 370-18 where boxes are used as pull and junctions boxes.

The words "trade size" when used in this specification and claims in relation to junction boxes refer to those box dimensions given in the foregoing Table 370-6(a-1), and encompassed within Article 370-6(a) and (b) of the National Electrical Code.

The face plate 4 is secured to mounting strap 90 which has openings 91 to receive mounting screws 92 therethrough. The openings 91 are on centers normally spaced three and one quarter inches apart. The ground fault receptacle described herein according to this invention is compact enough to fit between mounting screws 92 spaced three and one-quarter inches apart, or which are on centers which may be spaced apart any distance from three inches up to any desired maximum. This invention makes it possible to install ground fault receptacles in trade size junction boxes 93 having mounting screw recesses 94 on centers spaced apart 3.281 inches. The spacing may vary between three and three and a half inches.

The outer dimensions of the ground fault receptacle assembly of this invention, including the outer case 1 with the receptacle body 2 and module 3 therein is one and three-quarter inches wide, two and three-quarter inches long, two inches deep at one farthest point 95, one and three-quarters inches deep at each terminal end region 96 and one and seven-eighths inches deep throughout the balance of the rear mid-region 97.

With the plate 4 attached, the farthest front to back dimension is two and seven-sixteenth inches. The length and width dimensions are the same except for the mounting strap extending outwardly from opposite ends to provide mounting screw openings on centers spaced apart three and one-quarter inches. When mounted in a junction box 93, the face plate 4 is outward of the plane of the frontal opening of the box and the outer case 1 with receptacle body 2 and module 3 therein are inward of the frontal opening of the box.

The ground fault receptacle as described and shown herein, in accordance with this invention, includes features which enable its use in either 15 or 20 ampere 120 VAC circuits. Jaw members 11 and 12 are shown in the drawings as T-configurations, adapted to receive a T-bar or prong of an electrical plug for use in 20 ampere circuits. Obviously, the jaw members can be made with only two opposed jaw arms 98 and 99 to receive a flat bar or prong of a 15 ampere electrical plug. The additional cross-arm 100 which forms the T-configuration for 20 ampere service can obviously be omitted when desired for use in 15 ampere rated ground fault receptacles in accordance with this invention.

Figure 8:
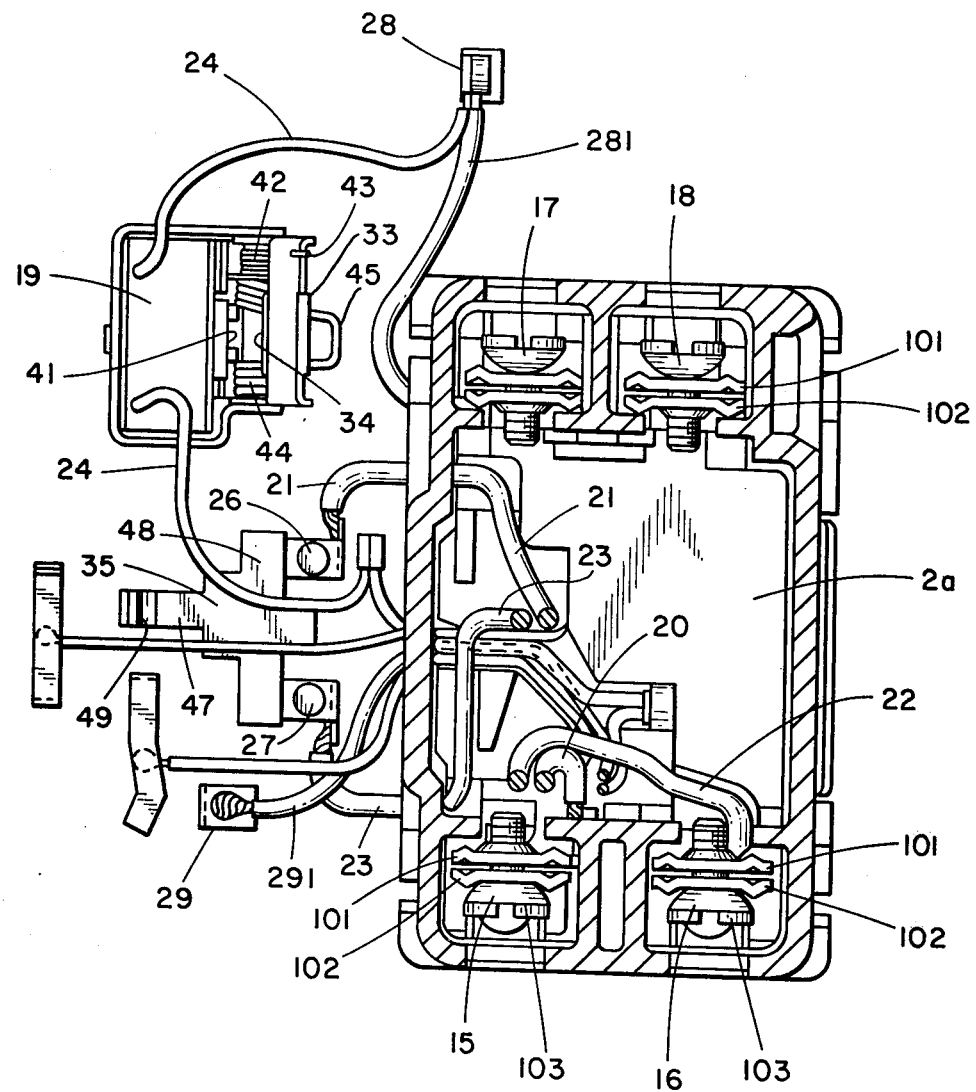
FIG. 8 is a bottom plan view of the receptacle body in FIG. 7, with the electronic module removed.

The terminals 15, 16, 17 and 18 may include a clamp comprising clamp plates 101 and 102 as illustrated in FIG. 8. The bared conductor wires of line and load are received between clamp plates 101 and 102 of the respective terminals. Plate 101 is drawn tightly against the conductor wire and towards plate 102 as clamp screw 103, threaded through plate 101, is rotated in the tightening direction.

In another modification (FIGS. 13 to 15), the line and load terminals 15–18 may include a single bearing plate 104 having a terminal screw 105 with shank 106 threaded therethrough. The line and load wires are connected to their respective terminals in this modification by tightening terminal screw 105 against the conductor wire held between the screw 105 and bearing plate 104. The conductor wire may then be soldered to plate 104 for a more completely secure connection.

The ground fault receptacle in accordance with this invention utilizes the small space available efficiently enough to provide room within the receptacle for a ground terminal 107 having a ground attachment screw 108. The terminal ground 107 is connected to ground sockets 109 and 110 (FIG. 10), positioned at outlets 8 and 7 to receive the ground prong of an electrical plug.

We claim:

1. A compact ground fault receptacle assembly for mounting in a common trade size junction box, comprising a unitary case having components mounted internally thereof, including internal socket means in said case for receiving the plug of an electrical appliance, internal conductor means in said case leading from said socket means for connection to an external power source, including said external power source, internal breaker contact means in said case to interrupt said conductor means, internal contact separation means in said case electrically connected to and powered by said external power source, internal sensing means in said case electrically and magnetically connected to said conductor means to detect an abnormal ground condition therein and to produce an electrical signal on detection thereof, internal signal responsive switching means in said case electrically connected to said contact separation means and said external power source to normally prevent application of full voltage of said external power source to said contact separation means thus rendering said separation means normally inoperative, said signal responsive switching means being electrically connected to said sensing means and being responsive upon receipt of an abnormal ground condition signal to cause full voltage of said external power source to be applied to said contact separation means rendering it operative to separate said breaker contacts and interrupt said conductor means, said internal socket means, internal conductor means, internal breaker contact means, internal contact separation means, and internal signal responsive switching means being operably mounted wholly within said case of said compact ground fault receptacle assembly, said internal conductor means includes feed-through terminals leading therefrom on the load side of said internal breaker contact means for ground fault protection of receptacles connected in parallel to said feed-through terminals, said internal contact separation means, said internal sensing means and said internal signal responsive switching means each including components operably mounted to perform multiple functions enabling incorporation of a complete and improved ground fault interrupting mechanism within the small confines of said case of said compact receptacle assembly.

2. A compact ground fault receptacle assembly as set forth in claim 1, wherein said components operably mounted to perform multiple functions include, in said internal contact separation means a trip coil and an armature operably mounted to both interrupt said internal conductor means on occurrence of a ground fault and provide an audible warning signal while said external line power source is connected to said feed-through terminals and a simulated ground fault condition is applied to the receptacle; also in said internal contact separation means a set of contacts operably mounted to control both the circuit carrying external power in said receptacle and the circuit connecting said trip coil to said internal signal responsive switching means; in said internal sensing means differential transformer means operably coupled to sense both a ground fault and a grounded neutral condition; and in said internal signal responsive switching means an amplifier to both amplify a ground fault signal received from said internal sensing means causing interruption of the external power circuit in such first event and provide high frequency oscillation on receiving a grounded neutral signal from said internal sensing means causing interruption of the external circuit also in such second event.

* * * * *